Sept. 27, 1927.
H. GREGER
VALVE GEAR
Filed Nov. 25, 1922
1,643,492
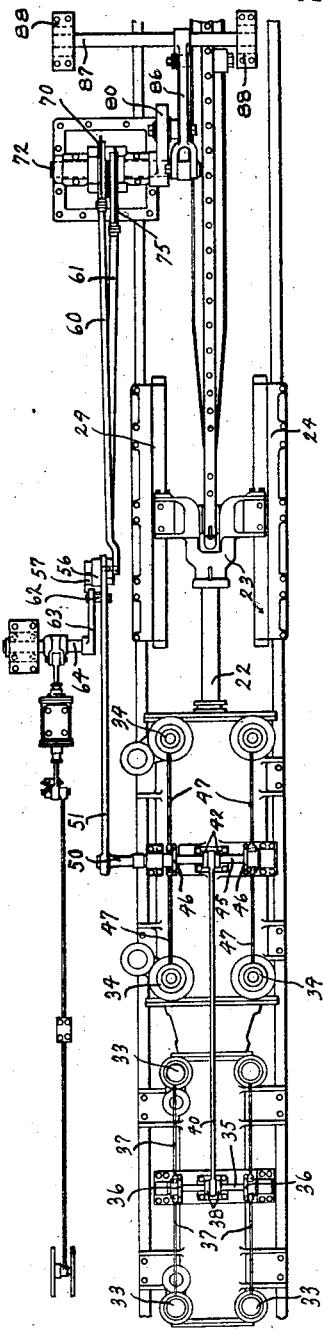
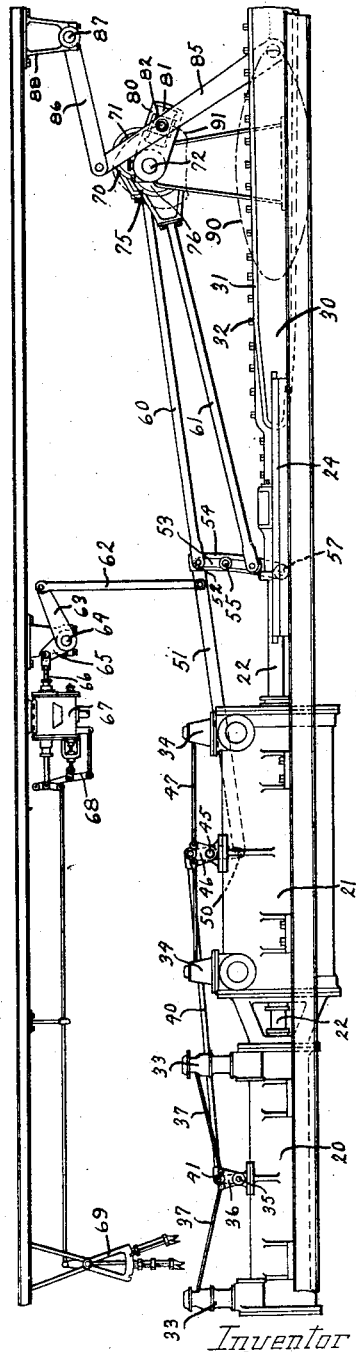
Witnesses
Charles E. Greene
Inventor
Henrik Greger
By Greer & Marechal
Attorney Patented Sept. 27, 1927.

1,643,492

UNITED STATES PATENT OFFICE.

HENRIK GREGER, OF HAMILTON, OHIO, ASSIGNOR TO THE HOOVEN, OWENS, RENTSCHLER COMPANY, OF HAMILTON, OHIO, A CORPORATION OF OHIO.

VALVE GEAR.

Application filed November 25, 1922. Serial No. 603,305.

This invention relates to valve gear, such as is used in connection with steam engines and the like.

One of the principal objects of the invention is to provide a new and improved form of valve gear which is simple in construction and operation, easily maintained in operating condition, and effective and reliable in operation.

Other objects and advantages will be apparent from the description thereof set out below when taken in connection with the accompanying drawing.

In the drawing, in which like characters of reference designate like parts throughout the several views thereof;

Fig. 1 is a side elevational view of a steam engine having incorporated therein the valve gear forming the subject matter of this invention; and Fig. 2 is a plan view of the apparatus shown in Fig. 1.

While this type of valve gear is of general application, it is shown in connection with a compound engine for driving the type of stern wheel boat which is quite largely used on the rivers of this country.

The general arrangement of the power plant of such a boat, comprises twin tandem engines, arranged on opposite sides of the boat, these engines being connected, by means of suitable connecting rods to cranks mounted upon opposite ends of the shaft of the paddle wheel. These cranks are preferably positioned with one 90° in advance of the other.

The engines for driving the paddle wheel may be of any suitable character, but preferably they are double expansion, compound engines, each engine consisting of a high pressure cylinder 20 and a low pressure cylinder 21, it being understood that the two engines are exactly alike except for such slight modifications as result from the fact that they are positioned for attachment to opposite ends of the paddle wheel shaft.

These engines are of the tandem type that is the cylinders are arranged one directly behind the other, with a single piston rod 22 functioning for both cylinders, this piston rod having two pistons mounted thereon, one of which serves as the piston for the high pressure cylinder 20 and the other as the piston for the low pressure cylinder 21. The free end of the piston rod 22 is connected to a cross head 23 which, during reciprocation of the pistons during operation of the engine, slides back and forth along cross head guides 24. This cross head is provided with a suitable wrist pin to which is connected one end of the respective connecting rod, the opposite end of which is connected to one of the cranks of the paddle wheel shaft. These connecting rods may be of any desired character but in boats of the type referred to they usually consist of a wooden bar 30 which is bound around, throughout its length, with a metal strip 31, the wooden bar and the metal strip being bolted together by means of a large number of bolts 32, this construction giving a very satisfactory type of connecting rod, inasmuch as it has sufficient strength and rigidity, with desirable lightness.

Any suitable type of valves may be used in the cylinders, and details of construction of the valve are not shown, each cylinder, however, being shown as provided with four valves, which may be of the conventional Corliss type, or of the poppet valve type, or of any other suitable type that may be desired. For purposes of description the valves in the high pressure cylinder are designated generally by the numeral 33 while those in the low pressure cylinder are designated by the numeral 34. Each high pressure cylinder is provided with a transverse shaft 35, mounted in suitable bearings, which shaft at each of its ends, is provided with a wrist plate 36, rigidly attached to the shaft and adapted to oscillate therewith. Each of these wrist plates is connected by means of suitable rods, or the like, 37, to the valves 33 on one side of the cylinder, oscillation of the shaft 35, with the wrist plates carried thereby, causing alternate actuation of the valves at opposite ends of the cylinder. Each shaft 35 is provided, intermediate its ends, with two upstanding arms or cranks 38, the outer ends of which have positioned therebetween one end of the rod 40, which is held in pivotal connection with the outer ends of the arms 38 by means of a suitable pin 41. The opposite end of the rod 40 is similarly connected to the arms 42, of the oscillatory shaft 45, which is positioned transverse to the low pressure cylinder 21, in suitable bearings. This shaft 45 is provided, upon opposite sides of the arms 42, with wrist plates 46, which are substantially identical in construction with the wrist plates 36, and which are connected, by means of suitable rods or the like 47, to the valves 34 of the low pressure cylinder. One end of the shaft 45 has attached thereto an arm or crank 50, which is pivotally connected to a rod 51, which rod in turn is actuated from any suitable source, to effect oscillation of the shaft 45, to operate the valves of the engine. By means of this construction oscillation of the shaft 45 causes oscillation of the shaft 35 at the same time, and thus operation of the various valves of the high and low pressure cylinders in proper relation, relative to each other, and in proper sequence, is insured. The rod 51, at its other end, is provided with a suitable pin or block 52, which cooperates with the slot 53 in the sector or link 54. This link 54 is pivoted substantially midway of its length to the pivot pin 55, which is carried upon the upper end of a second link 56, the lower end of which is pivotally connected to the bed plate, or some other fixed part of the structure, as shown at 57. The link 54 also has pivotally connected to its opposite ends the eccentric rods 60 and 61, the eccentric rod 60 being connected to its upper end and the eccentric rod 61 to its lower end. Pivotally connected to the rod 51, intermediate its ends, is a link 62, the other end of which is pivotally connected to a bell crank lever 63 which is in turn pivotally mounted upon a suitable shaft 64, the short arm of the bell crank lever being pivotally connected at 65, to the piston rod 66 of the reversing engine cylinder 67, which may be of any conventional character, and details of which are therefore not shown. This reversing engine has suitable valve gearing designated generally by the numeral 68, which may be actuated from a distance, by means of the apparatus designated generally by the numeral 69. Inasmuch as reversing mechanism of this type is well known details of construction thereof are not shown.

The mechanism thus far described constitutes what is in effect a modified form of the Stevenson link. By suitable operation of the reversing engine 67 the bell crank lever 63 may be swung about its pivot to swing the rod 51 about its pivot and thus operatively connect that rod to either the upper or the lower end of the link 54. As shown in Fig. 1 the rod 51 is connected to the upper end of the link 54, which is the forward position, and upon oscillation of the link 54 about its pivot point 55, under the action of the eccentric rods 60 and 61, steam will be so admitted to the engines as to cause forward motion of the boat. If it is desired to reverse the motion of the boat, so as to drive it astern, the reversing engine 67 is caused to function so as to move the rod 51 to connect it to the lower end of the link 54, in which case the valves of the engines will be so actuated as to cause the desired reverse motion.

The eccentric rod 60 is connected to an eccentric strap 70, which in turn cooperates with the eccentric 71, which is suitably keyed to the shaft 72, the opposite ends of which are mounted in suitable bearings carried by the standards 73, which are in turn supported upon the bed plate, or deck of the boat, in any suitable fashion. The eccentric rod 61 is connected to the eccentric strap 75, which cooperates with the eccentric 76, which is also mounted upon the shaft 72. As shown these eccentrics are so positioned upon the shaft as to give the desired oscillation of the link 54 during operation. This setting is entirely dependent upon the particular valve and operation that is desired, and anyone skilled in the steam engine art should be qualified to determine the desired setting of the eccentrics, and the other parts of this valve actuating mechanism.

One end of the shaft 72 has attached thereto a crank 80, which is provided with a slot 81 therein, in which is mounted a sliding block, in the nature of a cross head, 82, this construction being somewhat similar to the well known Scotch yoke. This sliding block is pivotally connected to the link 85, intermediate the ends of that link, the lower end of the link being pivotally connected, in any suitable manner, to the respective connecting rod, while the upper end is pivotally connected to a second link 86, the other end of which is mounted upon a shaft 87, supported in suitable bearings carried by the hangers 88.

As shown in Fig. 1 the point of pivotal connection of the link 85, to the connecting rod will, during operation, move substantially through the path designated by the dotted line 90. As it does move through this path it will cause rotation of the shaft 72, the point of connection of the sliding block 82 with the link 85 moving substantially through the path designated by the dotted line 91. The shaft 72 thus has imparted thereto continuous rotary motion, which, acting through the eccentric mechanism, causes the eccentric rods 60 and 61 to impart oscillatory motion to the link 54, this in turn causing actuation of the valve gear.

By means of the construction described above self-contained actuation of the valve gearing of each engine is secured. For the mechanism for actuating the valve gearing for each particular engine is actuated by the engine itself, and not by a companion engine as is the usual case. And so not only can each engine have its valve gearing independently adjusted; but each engine may be driven alone and without being in any way dependent upon the operation of the other engine or engines.

While the form of apparatus herein described constitutes a preferred embodiment of the invention, it is to be understood that the invention is not limited to this precise form of apparatus, and that changes may be made in either without departing from the scope of the invention which is defined in the appended claims.

What is claimed is:

1. In apparatus of the character described, the combination of a steam engine cylinder, valves therefor; valve actuating mechanism comprising a rotatable shaft, an eccentric mounted upon said shaft, means connecting said eccentric to the valve actuating mechanism; a crank having a slot therein mounted upon said shaft, a block slidably mounted within said slot; a connecting rod for said engine, a link member pivotally connected at one end to said connecting rod intermediate the ends of said rod and pivotally connected at the other end to a second pivotally mounted link, said first mentioned link being pivotally connected to the said sliding block, at a point removed from the end thereof which is pivotally connected to the connecting rod.

2. In a power plant of the character described, and in combination, an engine operatively connected to a work shaft, said engine comprising a power cylinder having a piston therein, a piston rod connected to said piston, a connecting rod connecting the piston rod to the work shaft; a valve within the cylinder, valve actuating mechanism associated with the cylinder; a rotatable shaft, a plurality of eccentrics thereon, an eccentric strap cooperating with each said eccentric, an eccentric rod connecting each eccentric strap to the said valve actuating mechanism; a crank mounted upon the end of the rotatable shaft, a sliding block carried by the crank, a pivotally mounted link pivotally connected adjacent one end to the sliding block and pivotally connected at the other end to the connecting rod, whereby reciprocating motion of the connecting rod imparts rotary motion to the said rotatable shaft; and adjustment means for operatively connecting the valve actuating mechanism to one eccentric or the other.

3. In a steam engine, comprising a cylinder, a piston and a valve therefor, and actuating mechanism for said valve; the combination of a crank shaft, a connecting rod connecting said crank shaft and piston, a rotatable eccentric shaft, a link pivoted at one end to a fixed support, a second link pivotally connected at one end to the free end of the first named link and at its other end to the connecting rod, a crank arm connected to the rotatable eccentric shaft, having a slot therein, a block slidable in said slot, and pivotal connection between said block and the said second link, an eccentric mounted upon said rotatable shaft, an eccentric strap cooperating with said eccentric and an eccentric rod connecting said eccentric strap to the valve actuating mechanism.

In testimony whereof I hereto affix my signature.

HENRIK GREGER.